United States Patent
Liljenstolpe et al.

(10) Patent No.: US 9,742,660 B2
(45) Date of Patent: Aug. 22, 2017

(54) VALIDATING A ROUTING FUNCTION

(71) Applicant: Metaswitch Networks Ltd, Enfield (GB)

(72) Inventors: Christopher Liljenstolpe, San Francisco, CA (US); Simon Wingrove, London (GB); Michael Curtis, San Francisco, CA (US); Tom Denham, San Francisco, CA (US); Paul Tiplady, San Francisco, CA (US); Alex Pollitt, San Francisco, CA (US)

(73) Assignee: METASWITCH NETWORKS LTD, Enfield (GB)

( * ) Notice: Subject to any disclaimer, the term of this patent is extended or adjusted under 35 U.S.C. 154(b) by 266 days.

(21) Appl. No.: 14/608,078

(22) Filed: Jan. 28, 2015

(65) Prior Publication Data
US 2016/0218964 A1 Jul. 28, 2016

(51) Int. Cl.
G06F 15/16 (2006.01)
H04L 12/721 (2013.01)
H04L 12/24 (2006.01)

(52) U.S. Cl.
CPC .......... H04L 45/14 (2013.01); H04L 41/0866 (2013.01); H04L 41/0893 (2013.01)

(58) Field of Classification Search
CPC ..... H04L 41/0893; H04L 45/02; H04L 12/28; H04L 41/0866; H04L 45/14
(Continued)

(56) References Cited

U.S. PATENT DOCUMENTS 5,889,953 A 3/1999 Thebaut et al.
6,741,572 B1 5/2004 Graves et al.
(Continued)

FOREIGN PATENT DOCUMENTS

TW 201106155 A1 2/2011
WO 00/44139 A1 7/2000

OTHER PUBLICATIONS

Cisco, "Implementing Routing Policy," ASR 9000 Series Aggregation Services Router Routing Configuration Guide, Release 4.2.x, 2014.
(Continued)

*Primary Examiner* — David Lazaro
(74) *Attorney, Agent, or Firm* — EIP US LLP

(57) ABSTRACT

Certain examples described herein provide a system and method for validating a routing function for a network device. In one example, a network device has a run-time policy engine, wherein the run-time policy engine implements a routing configuration file and the routing configuration file defines a routing function for network traffic. A file editor is also provided that loads the routing configuration file. The file editor has an editor policy engine that duplicates a functionality of the run-time policy engine. In one example, the routing configuration file has at least one validation portion that has one or more route statements with definitions indicative of expected routing function behavior. The file editor parses the routing configuration file by implementing the routing configuration file using the editor policy engine. The editor policy engine applies the routing function defined by the routing configuration file to the one or more route statements and indicates where a result of the routing function does not conform to the definitions indicative of expected routing function behavior. These examples
(Continued)

may help to reduce routing errors due to configuration errors in network devices.

20 Claims, 7 Drawing Sheets

(58) Field of Classification Search
USPC .................................................. 709/220, 238
See application file for complete search history.

(56) References Cited

U.S. PATENT DOCUMENTS

| | | | |
|---|---|---|---|
| 7,069,337 B2 | 6/2006 | Rawlins et al. | |
| 8,996,917 B1* | 3/2015 | Chandramohan ... | G06F 11/3696 714/26 |
| 2002/0021675 A1 | 2/2002 | Feldmann | |
| 2002/0126672 A1 | 9/2002 | Chow et al. | |
| 2012/0008634 A1* | 1/2012 | Tanimoto ............ | H04L 12/4641 370/401 |
| 2012/0057602 A1* | 3/2012 | Tanimoto ............ | H04L 41/0893 370/401 |
| 2012/0167160 A1* | 6/2012 | Carney .................. | H04L 45/02 726/1 |

OTHER PUBLICATIONS

Juniper Networks, Inc., "Configuring a Routing Policy with a Configuration Editor," 1999. http://www.juniper.net/techpubs/software/junos-es/junos-es92/junos-es-swconfig-interfaces-and-routing/configuring-a-routing-policy-with-a-configuration-editor.html.

Alcatel-Lucent, "Route Policies," 7750 SR OS Routing Protocols Guide 11.0r5.

* cited by examiner

```
>editor config_file          ← 310
editor ← 320

VALIDATION:            330
  should REJECT:
    route: 127.0.0.0/8 via 1.2.3.4

SUBROUTINES:
  MAIN:
    match X
    then accept                    300
```

FIG. 3A

```
>editor config_file
editor

VALIDATION:
  should REJECT:
    route: 127.0.0.0/8 via 1.2.3.4
  *ERROR* - ROUTE ACCEPTED ― 360

SUBROUTINES:
  MAIN:
    match X                        350
```

FIG. 3B

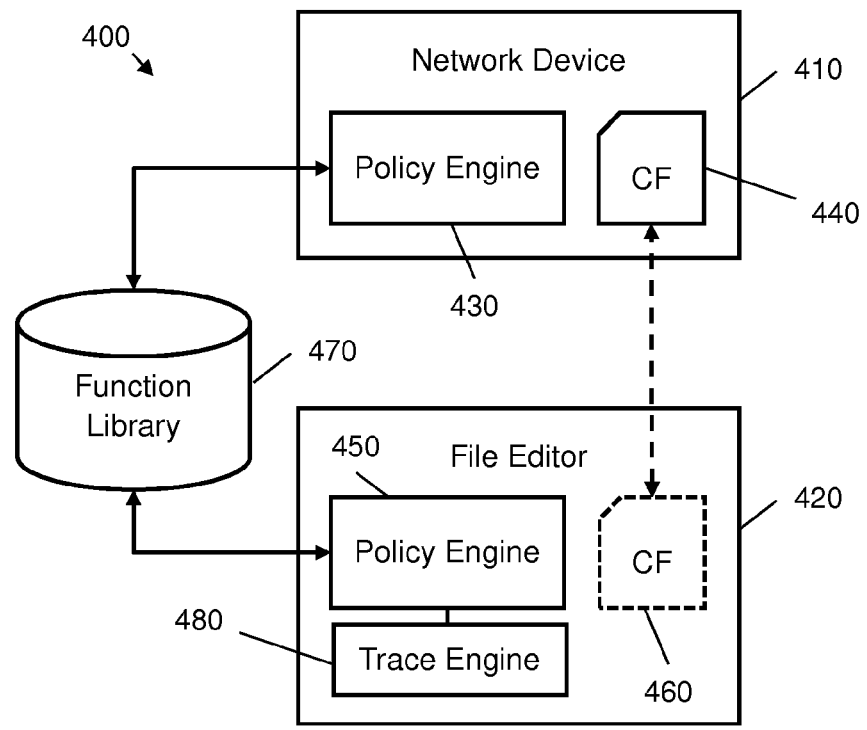
FIG. 4
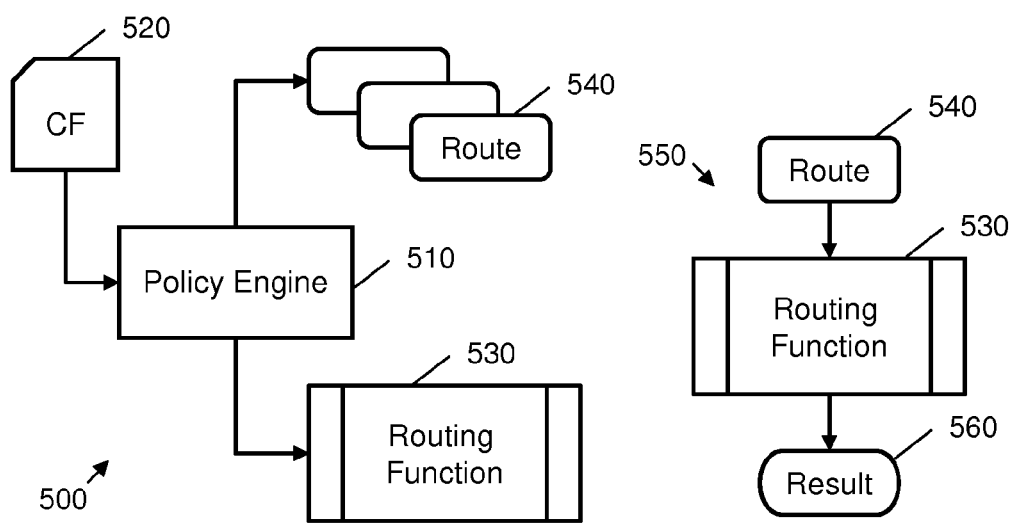
FIG. 5A
FIG. 5B

```
>Fri Dec 20 10:48:24 2014 127.0.0.0/8 via
1.2.3.4:
    Execute MAIN                                    — 715
>Fri Dec 20 10:48:24 2014 127.0.0.0/8 via
1.2.3.4:
        Execute (DENY && EXTERNAL)                  — 720
>Fri Dec 20 10:48:24 2014 127.0.0.0/8 via
1.2.3.4:
            Execute DENY                            — 725
>Fri Dec 20 10:48:24 2014 127.0.0.0/8 via
1.2.3.4:
                match X -> accept                   — 730
>Fri Dec 20 10:48:24 2014 127.0.0.0/8 via
1.2.3.4:
            Execute EXTERNAL                        — 735
>Fri Dec 20 10:48:24 2014 127.0.0.0/8 via
1.2.3.4:
                longer than Y -> reject             — 740
>Fri Dec 20 10:48:24 2014 127.0.0.0/8 via
1.2.3.4:
        Result of (DENY && EXTERNAL) - reject       — 745
>Fri Dec 20 10:48:24 2014 127.0.0.0/8 via
1.2.3.4:
    Result of MAIN - reject                         — 750
```

*FIG. 7*

VALIDATING A ROUTING FUNCTION

BACKGROUND OF THE INVENTION

Field of the Invention

The present invention relates to validating a routing function for a network device. In particular, but not exclusively, the present invention relates to processing a routing configuration file defining a routing function for network traffic in an electronic data network.

Description of the Related Technology

In a communications network, network devices are arranged and configured to control how information is transmitted across the network. For example, in a packet-switched network, one or more network devices such as routers, bridges, gateways, firewalls and switches may be arranged and/or configured to selectively forward packets across the network. A network device may perform a routing function using a routing table that lists a number of routes or paths through the network in order to deliver a packet to a defined destination. These network devices may also be arranged to perform a number of control plane routing functions, such as filtering packets, discarding packets, or providing certain packets with preferential routing.

A typical network device comprises an embedded computing device with a microcontroller arranged and configured to load computer program code in the form of firmware from a read-only or flash memory. The network device, through implementation of the firmware, may present a network interface that allows the network device to be configured. For example, a router may present a command line interface that may be accessed locally or remotely to configure the router. A current configuration may be stored as variable values in an accessible data store, such as a non-volatile computer storage medium. To update a configuration of the network device, one or more commands may be received by the network interface, e.g. as entered by a user or automated script. This may differ for each network device and/or network device manufacturer. For examples, these commands may be processed by the network device to update variable values stored in the accessible data store. Depending on the network device and/or its operational settings, the commands may either have immediate effect or may be committed as a batch, e.g. at a user-specified or system-mandated time.

Configuring a network device, for example as described above, presents difficulties for network operators. Generally, the only test of a configuration, such as a new or modified routing policy, is whether the network device performs correctly in the real world. This is less than ideal. In one scenario the network device may fail and reset to an earlier configuration (so called "auto-revert"); this may cause the network device to go offline for a number of minutes. In another scenario, the network device may not immediately fail, but may operate an erroneous routing function that causes cascade errors across the network. In a worst case, the network device may simply stop working and require a site visit to restore to a previous firmware version and/or configuration. There is thus the desire to minimize routing errors due to configuration errors, e.g. those introduced as a product of human error.

US 2002/0021675 A1 discloses a method and system of extracting relevant information from a collection of router configuration files and using the information to populate a data model. The data model provides a network-wide view of the topology and configuration, which may be used for a variety of network engineering tasks. Inconsistent definitions or dependence on default parameters on a router may give rise to errors. For example, although the router resolves such violations, the default handling may result in different behavior than intended by the human operator. The populated data model may be used to check for these errors.

However, external simulators and data models, such as that described above, have a disadvantage in that they are separate from the operational network reality. For example, the data models are an abstraction of the network and often a real-world network has non-linear dynamic characteristics that are not accommodated in, or predicted by, these data models. The data models are also only as accurate as the supplied information; they can quickly become stale as a network changes and evolves over time. Moreover, these external simulators and data models are often onerous to apply; for example, they require a modelling software suite to be installed and applied. In practice this means that, despite being available, they are often not applied correctly.

There is thus still a desire to minimize routing errors due to configuration errors and to do this in manner that may be successfully and easily implemented in a real-world network environment.

SUMMARY

According to a first embodiment of the present invention, there is provided a system for validating a routing function for a network device comprising: a network device comprising a run-time policy engine, the run-time policy engine being arranged to implement a routing configuration file, the routing configuration file defining a routing function for network traffic; and a file editor arranged to load the routing configuration file, the file editor comprising an editor policy engine that duplicates a functionality of the run-time policy engine, wherein the routing configuration file comprises at least one validation portion, the validation portion comprising one or more route statements with definitions indicative of expected routing function behavior, wherein the file editor is arranged to parse the routing configuration file by implementing the routing configuration file using the editor policy engine, the editor policy engine being arranged to apply the routing function defined by the routing configuration file to the one or more route statements and to indicate where a result of the routing function does not conform to the definitions indicative of expected routing function behavior.

According to a second embodiment of the present invention, there is provided a method for validating a routing function for a network device comprising: loading a routing configuration file for a network device, the routing configuration file being implemented by a policy engine, the policy engine being used by the network device to provide a routing function for network traffic based on the routing configuration file; parsing at least one validation portion of the routing configuration file, the validation portion comprising one or more route statements with definitions indicative of expected routing function behavior, the parsing including: implementing the routing configuration file using the policy engine to apply the routing function to the one or more route statements; and indicating where a result of the routing function does not conform to the definitions indicative of expected routing function behavior.

According to a third embodiment of the present invention, there is provided a non-transitory computer-readable storage medium comprising computer-executable instructions, which, when executed by a processor, cause a computing device to perform a method of validating a routing function, the method comprising: loading a routing configuration file for a network device, the routing configuration file being implemented by a policy engine, the policy engine being used by the network device to provide a routing function for network traffic based on the routing configuration file; parsing at least one validation portion of the routing configuration file, the validation portion comprising one or more route statements with definitions indicative of expected routing function behavior, the parsing including: implementing the routing configuration file using the policy engine to apply the routing function to the one or more route statements; and indicating where a result of the routing function does not conform to the definitions indicative of expected routing function behavior.

Further features and advantages of the invention will become apparent from the following description of certain examples, which is made with reference to the accompanying drawings.

BRIEF DESCRIPTION OF THE DRAWINGS

FIG. 3A is a schematic diagram showing a first view of a file editor according to one or more embodiments of the present invention.

FIG. 3B is a schematic diagram showing a second view of a file editor according to one or more embodiments of the present invention.

FIG. 4 is a schematic diagram showing a network device according to one or more embodiments of the present invention.

FIG. 5A is a schematic diagram showing implementation of a configuration file according to one or more embodiments of the present invention.

FIG. 5B is a schematic diagram showing a routing function according to one or more embodiments of the present invention.

FIG. 7 is a schematic diagram showing a trace output according to one or more embodiments of the present invention.

DETAILED DESCRIPTION OF CERTAIN INVENTIVE EMBODIMENTS

Certain examples described herein help to reduce routing errors due to configuration errors in network devices. This maintains network availability and prevents downtime due to human error. Certain examples described herein use a policy engine to implement a routing function of a network device. The functionality of the policy engine is duplicated between the network device and an editor. The editor is used to load and edit a routing configuration file that is used to implement the routing function. A number of validation portions within the routing configuration file are used to determine where a result of the routing function does not conform to expected behavior. As the functionality of the policy engine is duplicated between the network device and editor, any validation performed by the editor is based on functionality that is applied in operation on the network. Also as the configuration of the network device is defined through a user-editable router configuration file, validation may be performed at a time of configuration modification, e.g. without applying any external simulators or testing software. For example, the validation portions may be applied when saving the configuration file, when switching between available configuration files, when restoring a backup configuration file and/or when uploading the configuration file to the network device.

Example Network Device and Example File Editor

Figure 1:
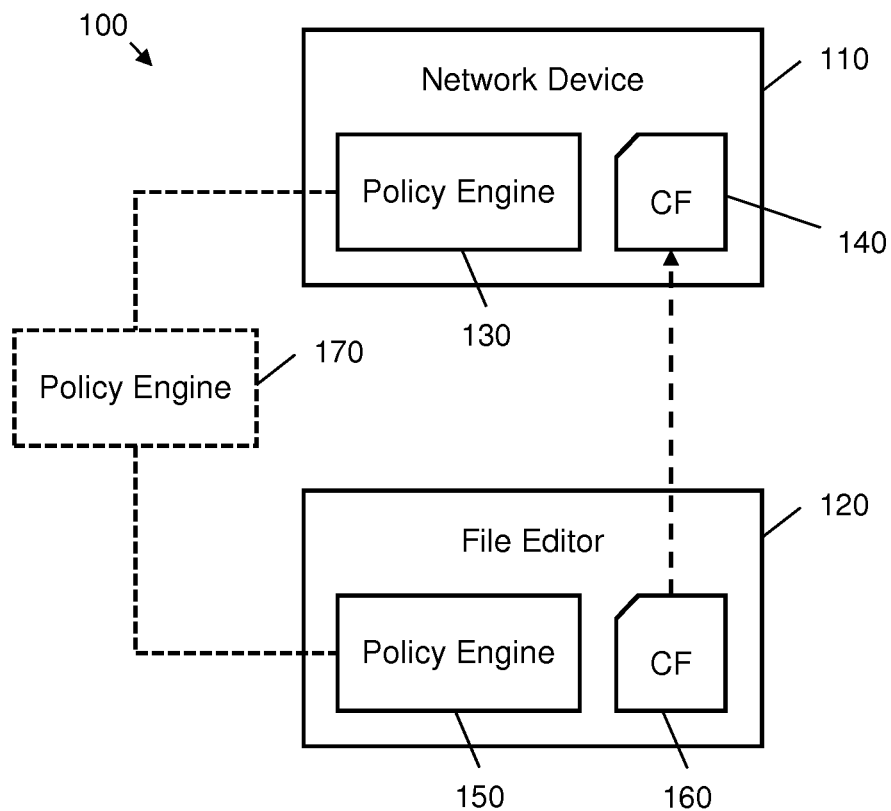
FIG. 1 is a schematic diagram showing a network device according to one or more embodiments of the present invention.

FIG. 1 shows an example 100 of a network device 110. The network device 110 may comprise, amongst others, a router, a bridge, a gateway, a firewall and a switch, and may be a hardware device, such as an embedded computer device, and/or a virtualized device. The network device 110 is, in use, communicatively coupled to one or more networks. Any physical layer coupling may be used, for example any wired and/or wireless connections. The network device 110 is arranged and configured to perform a routing function on the one or more networks. For example, the network device 110 may be arranged and configured to selectively forward packets in a packet-switched network and/or filter packets (e.g. selectively discard packets). In one case, the network device 110 may implement a routing protocol such as the Border Gateway Protocol (BGP), the Open Shortest Path First (OSPF) protocol, the Resource Reservation Protocol (RSVP), the Label Distribution Protocol (LDP) and/or the Intermediate System to Intermediate System (IS-IS) protocol. Interior gateway protocols and/or exterior gateway protocols may be used. The routing protocol is used by the network device 110 to communicate with other devices in the network so as to configure routing between nodes of the network. For example, the network device 110 may have knowledge of at least a portion of one or more networks it is directly coupled to and may use the routing protocol to acquire further knowledge of a wider network and/or additional devices on the one or more networks or one or more further networks. An exterior gateway protocol such as BGP enables network devices to exchange information autonomously. Routing may be performed for Internet Protocol (IP) packets, e.g. for one or more of version 4 (IPv4) and version 6 (IPv6). In certain cases static routing rules may be directly provided to the network device and/or label-switched paths may be learnt using LDP and/or RSVP.

The network device 110 of FIG. 1 comprises a first policy engine 130. The first policy engine 130 processes a first configuration file 140 in order to implement a routing function. The routing function is defined by way of electronic data from the first configuration file 140. In one case, the first configuration file 140 comprises a routing policy. The routing policy enables packets to be selectively communicated over a number of different paths depending on a number of configurable criteria. For example, in addition to (or instead of) a default network traffic path applied by a routing protocol (e.g. based on a packet's destination address), it may be desired to selectively route packets based on, amongst others, one or more of: path bandwidth, path switching, traffic loading, packet priority, packet source and packet destination. In this case, the routing configuration file 140 defines a set of filtering tests to apply to routes as defined by one or more of the routing protocol discussed herein. Further, use of the routing policy allows for a network operator to control which routes are installed and/or preferred in a network. For example, this may be based on a technical policy or network security policy. According to a defined routing policy, paths or routes for network traffic may be accepted or rejected based upon various characteristics of the path being advertised. These can include, but are not limited to, origin autonomous system (AS) for the route, intermediate AS path characteristics, length of the path, peer that the path was learned from, community strings set on the path, etc. For example, a number of alternative routes may be available and the routing policy may define how a preferred route is selected. A routing policy may also define how an accepted route is to be modified. For example, an accepted route may be modified to set a relative preference, delete or sanitize certain information associated with the route (e.g. removing private information) and/or tag the route with additional information. A routing policy may be implemented as a routing function that is applied to incoming route announcements delivered to the routing process running on network device 110 (e.g. a BGP process). For example, a routing function may comprise one or more conditions that are evaluated with respect to the proposed path or route. The routing function may comprise one or more sub-routines to apply a nested hierarchy of processing. This can allow complex routing policies. In one case, the first policy engine 130 may be implemented using a cross-platform scripting language.

The example 100 of FIG. 1 also shows a file editor 120. The file editor 120 is arranged to allow a user to edit a second configuration file 160. In the example of FIG. 1 the file editor 120 may be used to create and/or edit the second configuration file 160 that is then uploaded or otherwise copied for use as the first configuration file 140 in network device 110. In other examples, e.g. as described in more detail with reference to FIG. 4 below, file editor 120 may be used to edit the first configuration file 140 remotely, e.g. in memory in the network device 110. In FIG. 1, the file editor 120 comprises a second policy engine 150. As shown by the dotted line in FIG. 1, both the first policy engine 130 and second policy engine 150 are copies of a common policy engine 170. As such, both the first policy engine 130 and the second policy engine 150 duplicate a functionality of the common policy engine 170. In one case, the each policy engine 130, 150 may comprise common implementing computer program code, for example in the form of firmware or other executable instructions. Another case is shown in FIG. 4. Other implementations are also possible.

In the example 100 of FIG. 1, the first policy engine 130 comprises a run-time policy engine that is used to implement the routing function for live network traffic. The first policy engine 130 implements the configuration file 140 that defines the routing function. The file editor 120 is arranged and configured to parse the second configuration file 160 using the second policy engine 150. As the second policy engine 150 implements the same functionality as the first policy engine 130, the second configuration file 160 is parsed in a manner that is duplicated by the first policy engine 130. Hence, the second configuration file 160 is processed in a manner equivalent to processing in network device 110.

Example Configuration File

Figure 2:
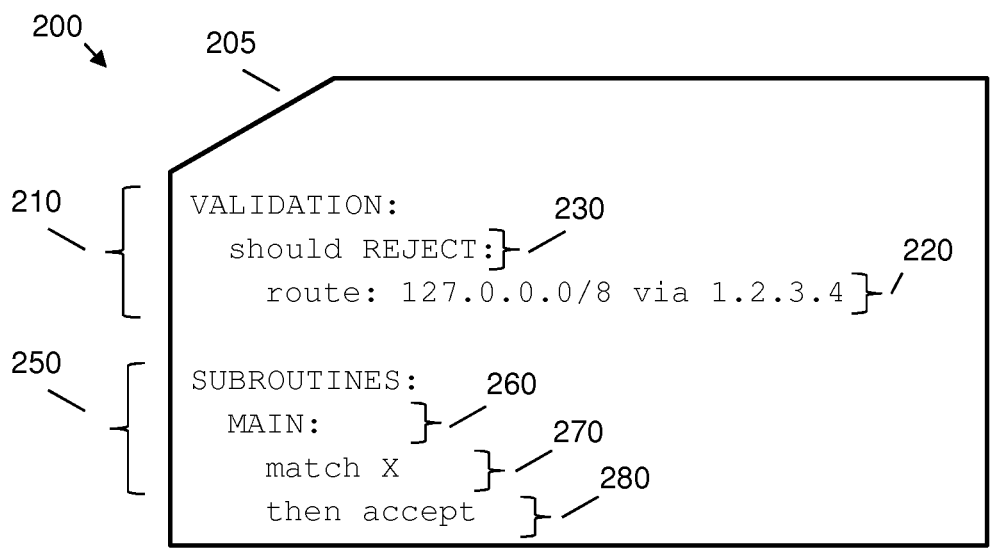
FIG. 2 is a schematic diagram showing a configuration file according to one or more embodiments of the present invention.

An example 200 of a configuration file 205 is shown in FIG. 2. This configuration file 205 may comprise the first configuration file 140 and/or the second configuration file 160 of FIG. 1. The configuration file 205 comprises a first validation portion 210 and a second subroutine portion 250. The second subroutine portion 250 comprises one or more statements that define a routing policy. The first validation portion 210 comprises one or more route statements 220 with definitions indicative of expected routing function behavior 230. In FIG. 2 the route statement 220 comprises: "route: 127.0.0.0/8 via 1.2.3.4". The definition indicative of an expected routing behavior 230 comprises: "should REJECT", i.e. the routing function as implemented using the second subroutine portion 250 should reject, rather than accept, the route defined by route statement 220. The second subroutine portion 250 of FIG. 2 comprises one subroutine—"MAIN" 260, which in turn comprises a match statement 270, e.g. that a route passed to the subroutine should accept a route that matches condition "X" as indicated by the "accept" action 280 following the "then" statement. It should be noted that in other examples, the resulting action may be implicit, e.g. set as a default in the configuration of the system. For example, if not explicit action is defined an "accept" action may be inferred in certain cases.

FIG. 2 shows an example based on a BGP route. In this case, the routing configuration file may comprise a BGP policy, e.g. a set of filtering tests to be applied to routes learnt using the BGP. The BGP policy may be applied when importing and/or exporting routes from/to neighboring network devices. A BGP route for IP may comprise one or more of: an IP prefix for which the route applies (e.g. 10.11.0.0/16 indicates that this route applies to all IP addresses that match 10.11 in their first 16 bits); a next hop, which is the address of a network device (e.g. a router) to which packets for that prefix should be sent (this may be the same address as the router that is sending the route); an Autonomous System (AS) path, which is a sequence of Autonomous System numbers indicating who the route was learned from; communities, a list of 32-bit labels which are agreed between the two parties exchanging routes (e.g. they may use label 1234 to indicate a high-bandwidth route or 5678 to indicate a route that should only be used on Thursdays); and various other metadata. A network device such as a router may have a standard function to prioritize between routes that share prefixes; however, a routing policy may make changes to that function. A routing policy defined by the configuration file may apply conditional logic to one or more of the route properties. As another example, the pseudo-code statement: "If ($ORIGIN_AS) is a member of {$BANNED_AS_LIST} then reject" would reject any originating autonomous system that matches a blacklist of unsuitable autonomous systems. Although this example is based on BGP, policies for other protocols may also be processed according to the methods and systems described herein.

In a BGP example, a route may be accepted, modified and accepted, or rejected. If a route is accepted, it then is considered, along with all other routes, when calculating a best path to reach a given destination. Each implementation of a routing protocols may comprise logic defined in their specification as to how selection from a set of approved routes is performed. If modification of a route is performed, this may influence the selection criteria. If a route is rejected, it is not used in the selection process. For example, the statement "with metric 100" may indicate that routes with a metric value of 100, which may be a label or a variable value, are preferred to routes that do not have a metric value of 100. In other words, the metric is used to select between multiple otherwise identical routes from different sources, e.g. for traffic engineering reasons.

Turning to the example of FIG. 1, the configuration file 205 of FIG. 2 may be created and/or edited as the second configuration file 160 using the file editor 120. In one case, the file editor 120 is configured to parse an open configuration file in response to an action. This action may be saving the configuration, selecting the file for upload or implementation on the network device and/or inputting a command, e.g. a particular key combination such as CTRL-SHIFT-V. The action may also comprise switching between different uploaded configuration files and/or restoring a backup. In certain cases, there may be different configuration files for different conditions, e.g. one may define a weekday configuration and one may define a weekend configuration. In this case, when switching between a weekday and weekend configuration the methods described herein may be activated. Parsing the open configuration file comprises applying the second policy engine 150. The second policy engine 150 implements a supplied configuration file and is configured to apply the routing function defined by the supplied configuration file to the one or more route statements, e.g. 220, and to indicate where a result of the routing function does not conform to the definitions indicative of expected routing function behavior, e.g. 230.

Example Output

FIGS. 3A and 3B show examples 300 and 350 of editing a routing configuration file and indicating where a result of the routing function does not conform to the definitions indicative of expected routing function behavior. FIG. 3A shows a command line interface. In a first command 310, a user loads a file editor ("editor") to edit routing configuration file ("config_file"). In FIG. 3A this routing configuration file is the file 205 from FIG. 2. The text contents 330 of the file 205 is thus shown within an editor interface 320. Although the example of FIG. 3A shows a command line interface other variations may be used. For example, a graphical user interface may be provided such as an integrated development environment. Also, although text contents 330 are shown on the display, they may, in other examples, be accessed line by line via a remote interface and/or may be added interactively by sending one or more commands to the network and/or a server device. In the latter case, the network and/or server device may implement an editor in the form of a command parser that modifies a configuration file.

FIG. 3B shows the result of applying a policy engine to the routing configuration file. In this example, the policy engine implements a routing function as defined by the second subroutine portion 250. The routing function is applied to the route as defined by the route statement 220. In this case, the result of the routing function is to accept the route. Accepted routes may become candidate routes for addition to a routing definition or table of a network device. This output is compared by the file editor 120 to the definition indicative of an expected routing behavior 230. Here, the output "ACCEPT" conflicts with the definition, which required a "REJECT" output. Hence, an error is indicated on the editor interface 320. In this example, the error is indicated by inserting error text 360 into the routing configuration file and displaying the routing configuration file including the error text on a display device. The error text 360 is proximate to the route statement 220 in the first validation portion 210. In FIG. 3B the error text follows the route statement, e.g. on the same and/or a subsequent line of the text contents 330. The error text may be displayed in, amongst others, a different color, size and/or font. In cases where errors are reported as shown in FIG. 3B, e.g. within a configuration file being edited, a result of any proposed edits and/or routing function changes may be quickly ascertained as part of the editing process. This combines both the testing and editing processes. In other cases, any errors may be listed separately, for example in a log file and/or separate interface. In certain cases, the error text may comprise additional information associated with the error, e.g. a particular subroutine whose output resulted in the final routing output and/or any variable values that passed and/or failed conditional statements. In certain case, this additional information may be linked to the tracing information discussed later below. The error may be displayed together with syntax highlighting and/or "semantic" error reporting, e.g. relating to the function of the subroutines.

Another Example

FIG. 4 shows a network device according to a second example 400. This example 400 shows a network device 410 and a file editor 420 similar to those described with regard to FIG. 1. In the example 400, a first policy engine 430 of the network device 410 and a second policy engine 450 of the file editor 420 both have access to a common library of functions 470. The library of functions 470 are callable from both the first policy engine 430 and the second policy engine 450. In one case, the library of functions 470 may be accessible from a common remote storage device; in another case, the library of functions 470 may comprise copies of a common library that are available in local storage of each of the network device 410 and file editor 420. In the example 400 of FIG. 4, the file editor 420 is used to edit a configuration file 440 stored on the network device 410. This involves downloading a local copy of the configuration file 460 that may be edited and implemented by the second policy engine 450.

In another example, the functionality of the file editor 420 may be provided by the network device 410 itself. For example, this functionality may be accessed through a remote login to the network device 410, e.g. a secure shell/remote command line login. In this case, the network device 410 may duplicate an active configuration file 440 such that a duplicate configuration file 460 is available for editing without affecting the current routing function of the network device 410. The second policy engine 450 may thus comprise a duplicate implementation of the first policy engine 430 on the network device 410, e.g. a duplicate thread or process where available. Validation portions of a duplicate configuration file 460 may then be parsed by the second policy engine 450 before activating the configuration file. The use of duplicate configuration file 460 as active configuration file 440 may be dependent on a routing function implemented by the duplicate configuration file 460 conforming to, e.g. matching, the definitions indicative of expected routing function behavior in the duplicate configuration file 460.

In one case, a user may view an output of the policy engine 450, such as is shown in FIGS. 3A and 3B by remotely accessing a server computer, e.g. via a secure shell/remote command line login. In this case, the server computer may implement file editor 420 and may be arranged to remotely access network device 410. A user may edit configuration file 460 via remote access. In another case, one or more of network device 410 and policy editor 420 may comprise virtual network functions, which may be implemented on a virtual platform either locally or remotely.

The file editor 420 of FIG. 4 also comprises a tracing engine 480. The tracing engine 480 may be implemented with any of the examples described herein and/or may be implemented independently. The tracing engine 480 is configured to output a result of applying one or more policy command statements in the routing configuration file to one or more routes, e.g. as defined in the one or more route statements as shown in the example of FIG. 2. The tracing engine 480 may be activated using one or more trace statements in the routing configuration file. For example, a trace command may be added to one or more route statements in order to trace the routes defined therein. Additionally, or alternatively, a trace command may be associated with one or more policy command statements and/or subroutines, such that the trace engine 480 is activated with respect to the associated statements. A trace command may comprise the statement "trace" prior to a statement or subroutine to be traced. For example, the following pseudo-code shows a trace on the "accept" action of a "MAIN" subroutine that accepts routes from IP prefix "10.1/16".
SUBROUTINES:
  MAIN:
    from: prefix 10.1/16
    then:
      trace
      accept As such a trace command may belong to a set of action commands that include "accept", "reject" and "set metadata M".

A trace command may have one or more argument variables that control the application of the trace engine 480. For example, these variables may be used to apply one or more filter conditions to filter the routes that are traced. These conditions may be associated with a configurable proportion of routes to be traced, said routes being sampled from a set of routes that are processed by the routing function according to the configurable proportion, and/or an initial number of routes to be traced, the tracing engine being configured to be deactivated after the initial number of routes have been traced. A configurable proportion of routes may be selected using probabilistic sampling, e.g. tracing a configurable X % of routes. Control such as this may help minimize a performance impact of implementing tracing engine 480. Similarly, to prevent persistent performance reduction, only the first N routes that match a condition may be traced. An example of a trace output is described later below with reference to FIG. 7.

Example Routing Function

FIG. 5A shows an implementation of a configuration file according to an example 500. In FIG. 5A a policy engine 510 accesses a configuration file 520. The policy engine 510 is arranged to implement a functional programming approach and convert the configuration file 520 into at least one routing function 530, e.g. based on one or more subroutines defined within the configuration file 520. The policy engine 510 is also arranged to convert one or more route statements in a validation portion of the configuration file 520 into one or more respective route objects 540. These route objects 540 may comprise a data structure of the same form that is used to implement routes in an active network device. Although the term "policy engine" is used herein, the engine may alternatively be referred to as a "routing engine" as it is implements one or more routing functions of a network device.

FIG. 5B shows how a routing function 530 is applied. Each routing function 530 is configured to receive a route object 540 as an input, e.g. as an argument variable, and to return a result 560 of applying the routing function to the route object. The route object may comprise a defined data structure, as may the result. The result 560 of the routing function may comprise a variable indicating whether the route object is "accepted" or "rejected". In certain cases, the result 560 may also comprise one or more variables indicating one or more modifications to route object, e.g. to metadata of the route object if the route object is accepted.

Another Example of a Configuration File

Figure 6:
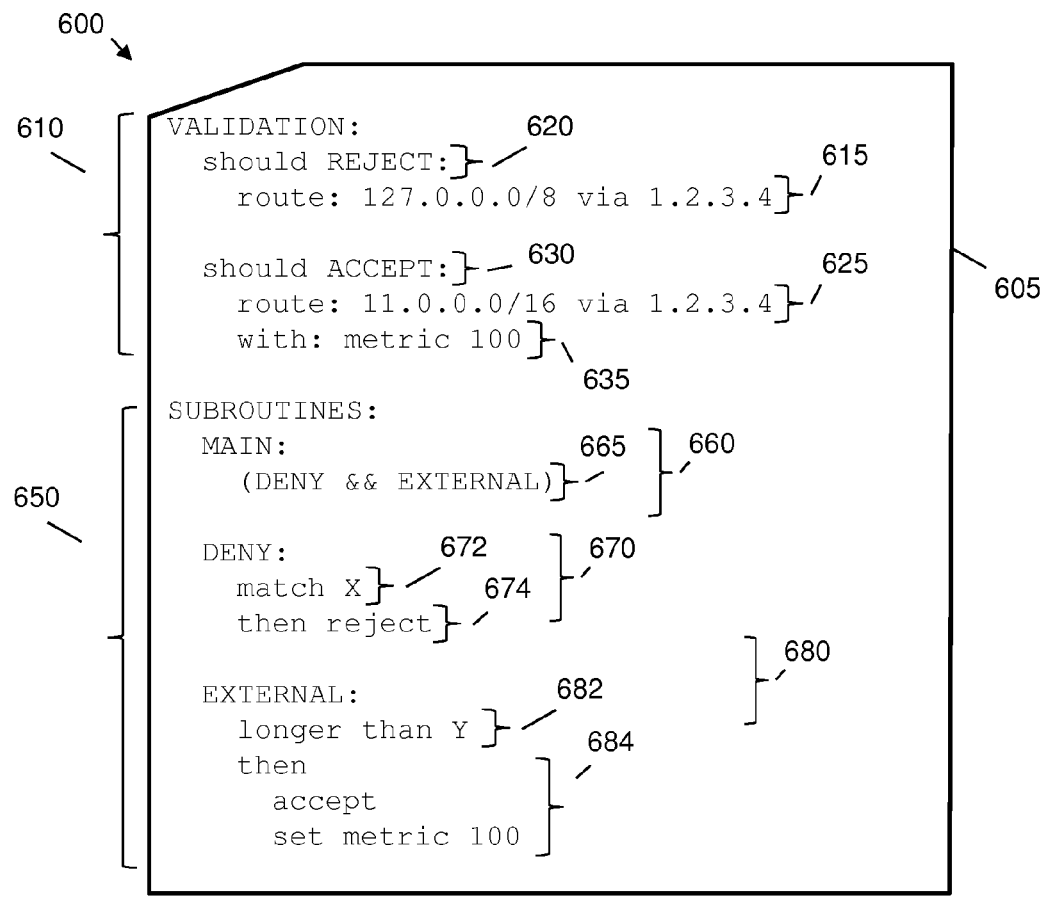
FIG. 6 is a schematic diagram showing a configuration file according to a second example.

FIG. 6 shows another example 600 of a configuration file 605. Although both examples 200 and 600 are necessarily simplified for ease of explanation, the example 600 shows a number of features that are available in certain examples and that are not shown in FIG. 2. As with the example 200 of FIG. 2, the configuration file 605 in FIG. 6 comprises a first validation portion 610 and a second subroutine portion 650. The first validation portion 610 comprises a first route statement 620 and an associated definition 620 that are equivalent to statement 220 and definition 230 in FIG. 2. The first validation portion 610 then also comprises a second route statement 625: "route: 11.0.0.0/16 via 1.2.3.4" and a second definition 630 indicative of an expected routing behavior: "should ACCEPT", indicating that the route defined in statement 625 should be accepted by a routing function. The second route statement 625 comprises an indication 635 of allowed modifications to the route defined in statement 625: "with: metric 100". This indicates that the route defined in statement 625 should be accepted by the routing function but that the route, following acceptance, should have a metric of 100, e.g. whether as an initial or modified value.

The second subroutine portion 650 of configuration file 605 comprises three subroutines: a "MAIN" subroutine 660; a "DENY" subroutine 670; and an "EXTERNAL" subroutine 680. The "MAIN" subroutine 660 has one expression statement 665: "(DENY && EXTERNAL)". This statement thus requires the both the "DENY" subroutine 670 and ("&&") the "EXTERNAL" subroutine 680 to accept a route for the "MAIN" subroutine 660 to accept a route. In one case, the logic "&&" may continue executing associated subroutines in the order specified until a "reject" is returned. A subroutine may have zero or more expression statements such as this, with any range of conditions. The "DENY" subroutine 670 has two command statements 672 and 674 similar to command statements 270, 280 in FIG. 2: "match X//then reject", e.g. a route that matches one or more routes or conditions X, which may be a list, will be rejected. The "EXTERNAL" subroutine 680 also has four command statements 682, 684: "longer than Y//then//accept//set metric 100", e.g. a route will be accepted and modified to have a metric of 100 if it is longer than route Y. A subroutine may have zero or more command statements such as these, with any range of conditions and/or actions. Actions include accept or reject behaviors, but can also be modification behaviors, such as "set community_string" or "prepend as." If an action does not reject the route, the processing chain continues. In certain cases, as discussed above, an action may be implicit in a defined subroutine, e.g. "match X" may as a default accept all routes that match condition X if a further action is not specified.

Example Trace Output

FIG. 7 shows a trace output 700 according to an example. FIG. 7 shows a schematic representation of an example display device that shows the trace output 700. The trace output 700 may be generated by trace engine 480 as described above. The trace output 700 may comprise an output that is generated as configuration file 605 is parsed and implemented and/or may comprise a loaded trace output, e.g. from a recorded log file.

In the example of FIG. 7, each line of the trace output 700 comprises three portions: a first portion 705 specifies a timestamp indicating when the trace was generated (e.g. in this example "Fri Dec 20 10:48:24 2014"); a second portion 710 indicates a route that the trace is applied to (e.g. in this example "127.0.0.0/8 via 1.2.3.4", which is the route defined in route statement 615 in FIG. 6); and a third portion 715 indicates a statement of a subroutine that is being evaluated, together with any result of the evaluation. In this example, the first and second portions of the trace 705 and 710 are repeated for each line of the trace output 700. The second portion 710 may be based on a cached string representation of a route. In other examples, the output may vary and comprise additional or fewer portions, and/or the shown portions may vary in syntax and format.

In FIG. 7, a first line of the trace output 700 indicates that the subroutine "MAIN" 660 is being evaluated (e.g. "Execute MAIN" 715). A second line of the trace output 700 indicates that the first statement of the subroutine "MAIN" 660 is being evaluated (e.g. "Execute (DENY && EXTERNAL)" 720). A third line of the trace output 700 indicates that subroutine "DENY" 670 is being evaluated (e.g. "Execute DENY" 725). A fourth line of the trace output 700 indicates that the first statement of the subroutine "DENY" 670 is being evaluated and the result of the evaluation is also output (e.g. "match X->accept" 730). In this case, there is no match between route "127.0.0.0/8 via 1.2.3.4" and condition X (which may be a defined route); hence, the route is accepted by the "DENY" subroutine. In other cases, the policy engine may be arranged to, as a default, accept a route that provides a match. A fifth line of the trace output 700 indicates that subroutine "EXTERNAL" 680 is being evaluated (e.g. "Execute EXTERNAL" 735). A sixth line of the trace output 700 indicates that the first statement of the subroutine "EXTERNAL" 680 is being evaluated and the result of the evaluation is also output (e.g. "longer than Y->reject" 740). In this case, route "127.0.0.0/8 via 1.2.3.4" is not longer than route Y and the route is rejected by the "EXTERNAL" subroutine. In other cases, the policy engine may be arranged to, as a default, accept a route that is not longer than variable Y. A seventh line of the trace output 700 indicates that the result of the statement 665 in the "MAIN" subroutine 660 is to reject the route (e.g. "Result of (DENY && EXTERNAL)—reject"). This is because the result of the two subroutines 670 and 680 is "(ACCEPT && REJECT)", which evaluates to "REJECT" (in this case "ACCEPT" may be considered to be represented by Boolean "True" and "REJECT" by Boolean "FALSE"). Finally, an eighth line of the trace output 700 indicates that the result of the "MAIN" subroutine 660 is to reject the route (e.g. "Result of MAIN—reject" 750).

As shown in FIG. 7 the trace engine 480 may be configured to indent and unindent ("dedent") nested subroutines and/or policy statements. This is useful for formatting the trace output 700. For example, before calling a subroutine, the calling function may be arranged to instruct the trace engine 480 to indent the trace so that the subroutine's trace lines are all indented. After the subroutine returns the lines may then be un-indented as shown in FIG. 7. The trace output 700 as described in this example enables a user to diagnose errors in a configuration file, which is especially useful for complex configuration files with a number of nested subroutines.

Example Methods

A number of example methods will now be described with reference to FIGS. 8 and 9. These example methods may be implemented by any of the systems of FIGS. 1 and 4, or may be implemented independently on an alternative system.

Figure 8:
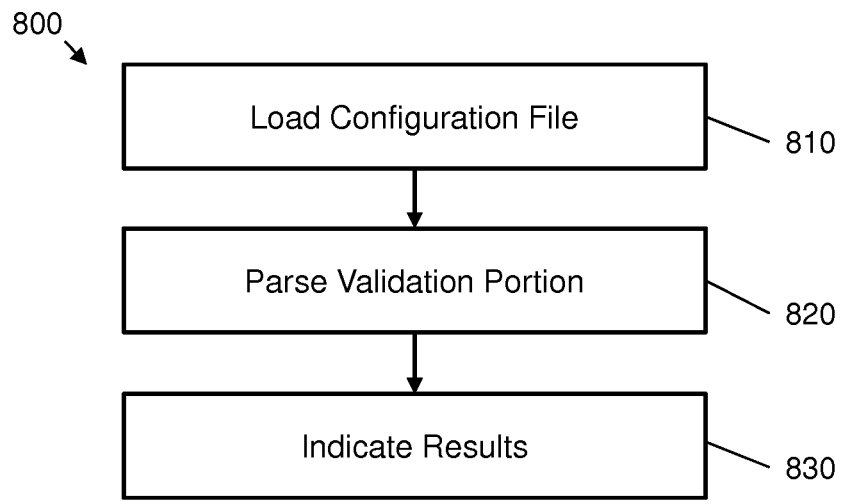
FIG. 8 is a flow chart showing a method of validating a routing function according to one or more embodiments of the present invention.

FIG. 8 shows a first method 800 of validating a routing function for a network device. The network device may comprise network device 110 or 410. At block 810, a routing configuration file for the network device is loaded. For example, this may be a copy of a configuration file in use by the network device or a new configuration file for the network device. In this example, the configuration file comprises at least one validation portion, e.g. a portion such as portion 210 in FIG. 2 and portion 610 in FIG. 6. At block 820, the at least one validation portion is parsed. This may comprise a process described below with reference to FIG. 9. The parsing at block 820 also comprises implementing the routing configuration file using a policy engine. This may comprise loading the policy engine, e.g. if it is not already loaded into memory, and passing the routing configuration file to the policy engine. For example, this may comprise converting one or more subroutines in the configuration file into one or more routing functions. In this case, the one or more routing functions are applied to route objects that are defined by route statements in the validation portion to generate a set of results. These results may comprise at least one variable indicating whether a route object is accepted or rejected, together with any modifications to the route object. At block 830 these results are compared to the definitions of expected routing behavior that are associated with the route statements. Where a result of the routing function does not conform to the definitions indicative of expected routing function behavior, this is indicated at block 830. For example, in one case, this may comprise inserting error text into the routing configuration file where a result of the routing function does not conform to the definitions indicative of expected routing function behavior and displaying the routing configuration file including the error text on a display device. In another case, this may comprise writing the indication to a file or other system output.

In certain examples, the configuration file may be edited between blocks 810 and 820. For example, block 820 may be initiated when the configuration file is saved or prepared for upload to the network device. In certain cases, the configuration file may comprise a copy of an in-use configuration file. In certain cases, the method may be applied at the network device, e.g. by way of a remote interface provided by the network device, or at a computer device implementing a file editor. In certain cases, the definitions indicative of expected routing function behavior comprise at least an indication of whether a route statement is to be accepted or rejected. The definitions may further comprise an indication of allowed modifications to a route object. In certain cases, the method may comprise, as part of block 820 and/or 830 outputting a trace of a result of one or more sub-functions of the routing function when implementing the routing configuration file. If at block 830 no errors are indicated, e.g. it is determined that a result of one or more routing functions matches the definitions indicative of expected routing function behavior, then the method 800 may further comprise implementing the routing configuration file on the network device. This may involve replacing an existing in-use version of the configuration file.

Figure 9:
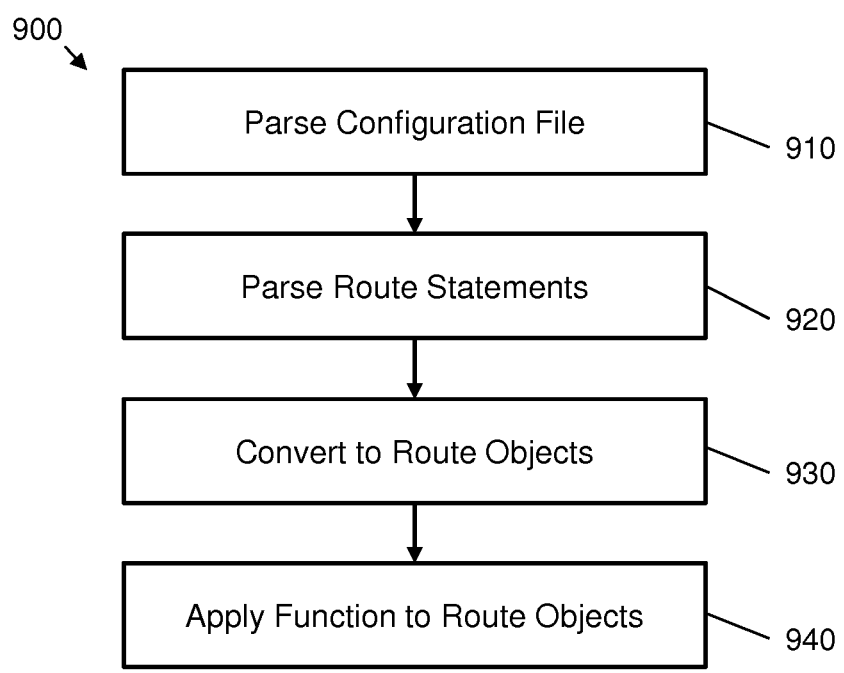
FIG. 9 is a flow chart showing a method of implementing a routing function according to one or more embodiments of the present invention.

FIG. 9 shows an example of a second method 900 of validating a routing function. This method may be performed when implementing a routing configuration file in method 800. At block 910, the configuration file is parsed to implement the routing function. At block 920, one or more route statements in the configuration are parsed. This may comprise identifying one or more route statements, such as statement 220 in FIG. 2 and statements 615 and 625 in FIG. 6. At block 930 one or more route objects are constructed based on the route statements, as for example illustrated in FIG. 5A. This may also comprise parsing one or more definitions indicative of an expected routing function behavior, such as definition 230 in FIG. 2 or definitions 620 and 630 in FIG. 6. At block 940, the routing function is applied to the each of the route objects to output the result of the routing function. In this case, indicating where a result of the routing function does not conform to the definitions comprises comparing the result of the routing function to the definitions indicative of expected routing function behavior. The result of the routing function may comprise a variable indicating whether a route object is accepted or rejected and the definitions indicative of expected routing function behavior may comprise an indication of whether a route statement is to be accepted or rejected. In certain cases, the result of the routing function comprises an indication of one or more modifications to an accepted route object and the definitions indicative of expected routing function behavior comprise an indication of allowed modifications, e.g. the addition, edit or deletion of metadata associated with the route object.

In one case, loading a policy engine may comprise loading a script and/or a set of library functions that implement the policy engine, e.g. into memory accessible by one or more processors including one or more microprocessors. In one case the configuration file may be parsed for syntactic and semantic errors before any validation portion is implemented. These errors may be inserted into a displayed version of the configuration version in a similar manner to that shown in FIG. 3B and/or returned as a command-line message. Although for simplicity, the validation portions in the described examples have one route statement, a plurality of route statements defining a plurality of respective routes may be included, e.g. may be associated with a particular definition indicative of expected routing function behavior. Additionally, the syntax shown in the Figures and described herein is for example only, such syntax may vary in different implementations of the examples while retaining equivalent functionality. In certain cases, any mismatch between a result of the routing function and definitions indicative of expected routing function behavior may also have an associated trace output, e.g. such as shown in FIG. 7, that indicates a portion of a defined subroutine where a mismatch originated.

In certain cases, a routing configuration file may comprise a copy of an in-use (i.e. original) routing configuration file, e.g. a temporary modifiable copy for editing. In this case, indicating where a result of the routing function does not conform to the definitions indicative of expected routing function behavior may comprises comparing the result of the routing function with an output generated by a routing function implemented by way of the original routing configuration file and authorizing use of the modified routing configuration file in the network device based on the comparing. In certain cases, live routes from a network device may be compared to the result of the routing function. This may allow a modified routing configuration file to be compared to an in-use routing configuration file, e.g. in a live network device. In certain cases, a threshold may be defined wherein use of the modified routing configuration file, e.g. via upload and/or storage on a network device, is authorized when a number of changes are below the threshold. For example, a modified version may be authorized if less than X % of routes are changed. In other cases, a flagging or indicating or errors may be performed in a number of modified routes exceeds a predefined threshold.

Certain methods as described above may be implemented in a hardware controller of a network device and/or a processing environment of a computer system. Respective examples are shown in FIGS. 10A and 10B.

Figure 10A:
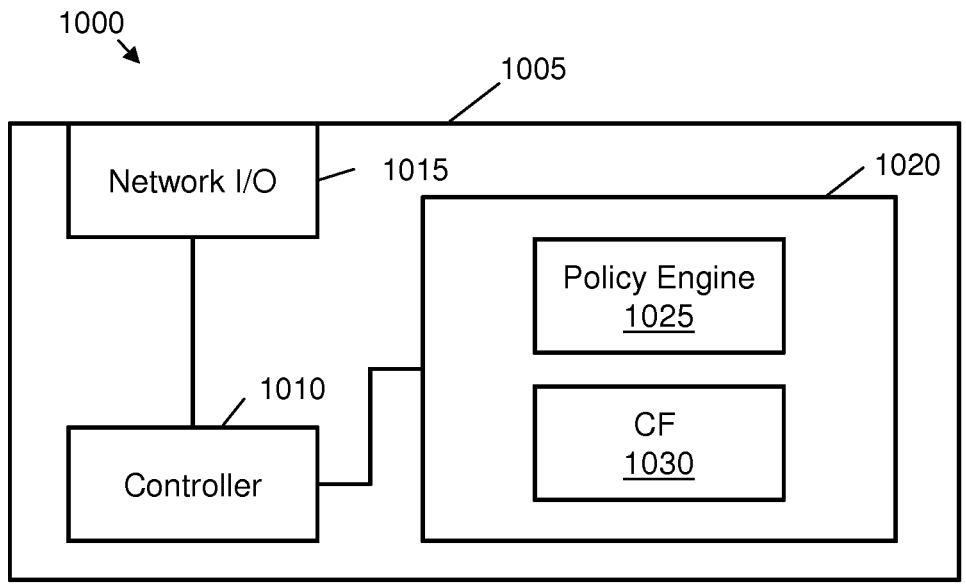
FIG. 10A is a schematic diagram showing components of a network device according to one or more embodiments of the present invention.

FIG. 10A shows an example 1000 of a network device 1005. As with the other Figures, this illustration is schematic and certain features have been omitted for clarity of explanation. The network device 1005 comprises a controller 1010, a network interface 1015 and computer-readable medium 1020. The controller 1010 may comprise one or more microprocessors, e.g. comprise a system-on-chip or a programmable logic controller. The computer-readable medium 1020 may comprise a (non-transitory) storage device accessible to the controller 1010 such as a non-volatile memory. In this example, the computer-readable medium 1020 stores program code arranged to implement a policy engine 1025 and data comprising a configuration file 1030. In certain examples, these two objects need not be stored in a common computer-readable medium, e.g. may be stored in different and/or separate storage mediums accessible to the controller 1010. The program code of the policy engine 1025 is executable by the controller 1010 to cause the network device to perform at least one of the methods described above. The network device 1005, in use, performs network routing functions by sending and/or receiving network traffic via the network interface 1015, which may comprise one or more physical network ports. The network device 1005 performs network routing functions by implementing the policy engine 1025 according a specification/configuration defined by the configuration file 1030, e.g. the policy engine 1025 implements a routing function that is applied to route object associated with received data packets.

Figure 10B:
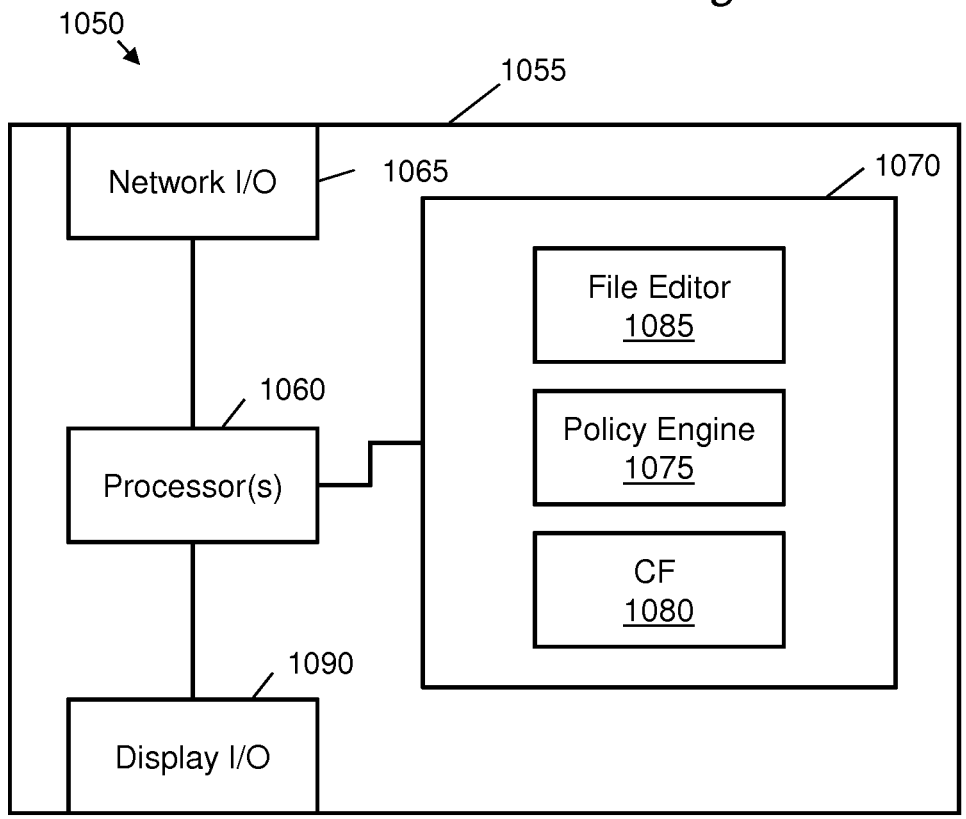
FIG. 10B is a schematic diagram showing components of a computer device implementing a file editor according to one or more embodiments of the present invention.

FIG. 10B shows an example 1050 of a computer device 1055. As set out above, this illustration is schematic and certain features have been omitted for clarity of explanation. The computer device 1055 comprises one or more processors 1060 (e.g. central processing units—CPUs), a network interface 1065 and computer-readable medium 1070. The computer-readable medium 1070 may comprise a (non-transitory) storage device accessible to the processors 1060 such as random access memory (RAM) and/or a solid state or magnetic storage device. In a case where the computer-readable medium 1070 comprises RAM, the contents of the memory may be loaded from a non-volatile storage device. In this example, the computer-readable medium 1070 stores program code arranged to implement a file editor 1085, a policy engine 1075 and data comprising a configuration file 1080. As described above the policy engine 1075 may comprise the same program code as policy engine 1025, and/or these may be implemented by accessing common library files. In certain examples, these objects need not be stored in a common computer-readable medium, e.g. may be stored in different and/or separate storage mediums accessible to the processors 1060, e.g. including local and/or remote storage devices. The program code of the file editor 1085 and the policy engine 1075 is executable by the one or more processors 1060 to perform at least a portion of at least one of the methods described above. The computer device 1055 in this example further comprises a display interface 1090, which is useable to display an output as per any of FIGS. 3A, 3B and 7.

In any of these examples the routing configuration file may comprise a markup language definition file and/or a definition such as a YAML file. In certain cases, the routing configuration file may be seen as a form as computer program code, having definitions and/or subroutines. Certain examples described herein may be implemented for a network device that filters routes according to the Border Gateway Protocol. In certain examples, the network device may use one or more of the Interior Gateway Protocol (IGP), the Resource Reservation Protocol (RSVP) and the Label Distribution Protocol (LDP) to implement a network routing function. The examples described herein may be applied to any of these cases. The examples described herein may also be applied to validate packet processing policies, such as access control lists. Certain examples described herein may further be implemented on routing configuration portions that omit the validation portion; in these cases the routing configuration file may be checked for syntactic and/or semantic errors and/or a trace may be applied. In one variation, the editor policy engine may comprise a copy in the form of a duplicated program thread of the run-time policy engine. This editor policy engine may be located on a user computer device, a server computer device, and/or on the network device itself. In this case, the routing configuration file may be parsed by the editor policy engine and results returned to the file editor. At least a portion of the file editor may be implemented on a user computer device that is remote from the editor policy engine, e.g. wherein the latter is being implemented on a server computer device or on the network device. As such an indication of the results of the validation may be remotely returned to the user computer device.

The above description describes a number of illustrative examples. Further examples are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

What is claimed is:

1. A system for validating a routing function for a network device, the system comprising:
   the network device, wherein the network devices comprises:
      a network interface for receiving data packets from a network,
      a run-time policy engine, and
      a memory to store a routing configuration file,
         wherein the run-time policy engine implements the routing configuration file to configure the network device to selectively forward data packets over the network via the network interface,
         the routing configuration file comprising one or more subroutine statements that define a routing function for network traffic; and
   a file editor arranged to load and edit the routing configuration file,
      the file editor comprising an editor policy engine that duplicates a functionality of the run-time policy engine,
         wherein the routing configuration file further comprises at least one validation portion, the validation portion comprising one or more route statements defining possible routes for data packets within the network, the one or more route statements having definitions indicative of expected routing function behavior for the one or more routes,
         wherein, following an edit of the routing configuration file:
            the file editor is arranged to parse the routing configuration file by implementing the routing configuration file using the editor policy engine, and
            the editor policy engine is arranged to apply the routing function defined by the one or more subroutine statements of the routing configuration file to the one or more route statements and to indicate where a result of the routing function for the one or more routes does not conform to the definitions in the validation portion of the routing configuration file that are indicative of expected routing function behavior.

2. The system of claim 1, comprising:
   a library of functions to implement the functionality of the run-time policy engine,
   wherein the library of functions are callable from both the run-time policy engine and the editor policy engine.

3. The system of claim 1, wherein file editor is configured to implement the one or more route statements as respective route objects and the run-time policy engine and the editor policy engine are configured to implement the routing configuration file by converting at least a portion of the routing configuration file into the routing function, the routing function being arranged to receive a route object as a variable and to return an indication of whether the route object is accepted or rejected.

4. The system of claim 1, wherein the file editor comprises:
   a tracing engine configured to output a result of applying one or more policy command statements in the routing configuration file to one or more routes.

5. The system of claim 4, wherein the tracing engine is activated using one or more trace statements in the routing configuration file, the one or more trace statements comprising one or more conditions to filter the routes that are traced.

6. The system of claim 5, wherein said one or more conditions comprise:
   a configurable proportion of routes to be traced, said routes being sampled from a set of routes that are processed by the routing function according to the configurable proportion; or
   an initial number of routes to be traced, the tracing engine being configured to be deactivated after the initial number of routes have been traced.

7. A method for validating a routing function for a network device comprising:
  loading a routing configuration file for a network device,
    the routing configuration file comprising one or more subroutine statements that define a routing function,
    the routing configuration file being implemented by a policy engine,
    the policy engine being used by the network device to provide the routing function based on the routing configuration file and to configure the network device to selectively forward data packets over a network;
  parsing at least one validation portion of the routing configuration file,
    the validation portion comprising one or more route statements defining possible network routes for data packets, the one or more route statements having definitions indicative of expected routing function behavior for the one or more routes,
    the parsing including:
      implementing the one or more subroutine statements of the routing configuration file using the policy engine to apply the routing function to the one or more routes defined by the one or more route statements; and
    indicating where a result of the routing function as applied to the one or more routes does not conform to the definitions in the validation portion of the routing configuration file that are indicative of expected routing function behavior.

8. The method of claim 7, wherein implementing the routing configuration file comprises:
  loading the policy engine; and
  passing the routing configuration file to the policy engine.

9. The method of claim 7, wherein indicating where a result of the routing function does not conform to the definitions comprises:
  inserting error text into the routing configuration file where a result of the routing function does not conform to the definitions indicative of expected routing function behavior; and
  displaying the routing configuration file including the error text on a display device.

10. The method of claim 7, wherein implementing the routing configuration file comprises:
  parsing the routing configuration to implement the routing function;
  parsing the one or more route statements;
  converting the one or more route statements into respective route objects; and
  applying the routing function to the each of the route objects to output the result of the routing function,
  and wherein indicating where a result of the routing function does not conform to the definitions comprises:
  comparing the result of the routing function to the definitions indicative of expected routing function behavior.

11. The method of claim 7, wherein the result of the routing function comprises a variable indicating whether a route object is accepted or rejected and the definitions indicative of expected routing function behavior comprise an indication of whether a route statement is to be accepted or rejected.

12. The method of claim 11, wherein the result of the routing function comprises an indication of one or more modifications to an accepted route object and the definitions indicative of expected routing function behavior comprise an indication of allowed modifications.

13. The method of claim 7, comprising:
  implementing the routing configuration file on the network device.

14. The method of claim 13, wherein loading, parsing and indicating are performed by an editor policy engine of a file editor and implementing is performed by a run-time policy engine of the network device, the editor policy engine duplicating a functionality of the run-time policy engine.

15. The method of claim 7, comprising:
  outputting a trace of a result of one or more sub-functions of the routing function when implementing the routing configuration file.

16. The method of claim 7, wherein
  the routing configuration file comprises one or more changes to a routing configuration file in use by the network device,
  the one or more route statements define network routes that are processed by the network device, and
  the definitions indicative of expected routing function behavior comprise routing function behavior of the network device in operation.

17. The method of claim 7, wherein the routing configuration file comprises a modified routing configuration file and wherein indicating where a result of the routing function does not conform to the definitions indicative of expected routing function behavior comprises:
  comparing the result of the routing function with an output generated by a routing function implemented by way of an original routing configuration file;
  authorizing use of the modified routing configuration file in the network device based on the comparing.

18. The method of claim 7, comprising:
  accessing a remote computer device to view an output indicating where a result of the routing function does not conform to the definitions indicative of expected routing function behavior,
  wherein the remote computer device performs the loading, parsing and indicating and wherein the remote computer device is communicatively coupled to the network device.

19. The method of claim 7, wherein the routing configuration file implements a Border Gateway Protocol policy.

20. A non-transitory computer-readable storage medium comprising computer-executable instructions, which, when executed by a processor, cause a computing device to perform a method of validating a routing function, the method comprising:
  loading a routing configuration file for a network device,
    the routing configuration file comprising one or more subroutine statements that define a routing function,
    the routing configuration file being implemented by a policy engine,
    the policy engine being used by the network device to provide the routing function based on the routing configuration file and to configure the network device to selectively forward data packets over a network;
  parsing at least one validation portion of the routing configuration file,
    the validation portion comprising one or more route statements defining possible network routes for data packets, the one or more route statements having definitions indicative of expected routing function behavior for the one or more routes, the parsing including:
- implementing the one or more subroutine statements of the routing configuration file using the policy engine to apply the routing function to the one or more routes defined by the one or more route statements; and
- indicating where a result of the routing function as applied to the one or more routes does not conform to the definitions in the validation portion of the routing configuration file that are indicative of expected routing function behavior.

\* \* \* \* \*